US012169101B2

(12) United States Patent
Morris et al.

(10) Patent No.: US 12,169,101 B2
(45) Date of Patent: Dec. 17, 2024

(54) EXHAUST HEAT RECOVERY FROM A MOBILE POWER GENERATION SYSTEM

(71) Applicant: Typhon Technology Solutions (U.S.), LLC, The Woodlands, TX (US)

(72) Inventors: Jeffrey G. Morris, The Woodlands, TX (US); Adrian Benjamin Bodishbaugh, Fayetteville, AK (US); Brett Vann, Houston, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 37 days.

(21) Appl. No.: 17/987,665

(22) Filed: Nov. 15, 2022

(65) Prior Publication Data
US 2023/0070621 A1   Mar. 9, 2023

Related U.S. Application Data

(63) Continuation of application No. 17/212,968, filed on Mar. 25, 2021, now Pat. No. 11,512,906, which is a
(Continued)

(51) Int. Cl.
*G05D 23/00* (2006.01)
*F02C 6/18* (2006.01)
(Continued)

(52) U.S. Cl.
CPC .............. *F28D 21/001* (2013.01); *F02C 6/18* (2013.01); *F28F 27/00* (2013.01); *E21B 43/26* (2013.01);
(Continued)

(58) Field of Classification Search
CPC .......... F28D 21/001; F01D 15/10; F02C 6/18; F28F 27/00; E21B 43/2607; E21B 43/26; F05D 2220/76
(Continued)

(56) References Cited

U.S. PATENT DOCUMENTS

| 2,554,228 A | 5/1951 | Walker et al. |
| 4,473,536 A | 9/1984 | Carberg et al. |

(Continued)

FOREIGN PATENT DOCUMENTS

| AR | 087298 A1 | 3/2014 |
| AR | 092923 A1 | 5/2015 |

(Continued)

OTHER PUBLICATIONS

Canadian Office Action of Canadian application No. 3087558 dated Aug. 31, 2020, 4 pages.
(Continued)

*Primary Examiner* — Davis D Hwu
(74) *Attorney, Agent, or Firm* — Fenwick & West LLP (57) ABSTRACT

A system and a method for heating source fluid, comprising: a turbine-electric generator transport comprising: an inlet plenum and an exhaust collector; a turbine connected to the inlet plenum and the exhaust collector; and an electric-generator coupled to the turbine; an exhaust heat recovery transport comprising: a combustion air connection coupled to the inlet plenum; an exhaust air connection coupled to the exhaust collector; a heat transfer assembly coupled to the exhaust air connection; and a fluid system coupled to the heat transfer assembly; an inlet and exhaust transport comprising: an air inlet filter housing coupled to the combustion air connection; and an exhaust stack coupled to the exhaust air connection.

19 Claims, 7 Drawing Sheets

Related U.S. Application Data continuation of application No. 16/236,734, filed on Dec. 31, 2018, now Pat. No. 10,962,305.

(60) Provisional application No. 62/612,986, filed on Jan. 2, 2018.

(51) Int. Cl.
*F28D 21/00* (2006.01)
*F28F 27/00* (2006.01)
*E21B 43/26* (2006.01)
*F01D 15/10* (2006.01)

(52) U.S. Cl.
CPC .......... *E21B 43/2607* (2020.05); *F01D 15/10* (2013.01); *F05D 2220/76* (2013.01)

(58) Field of Classification Search
USPC .......................................................... 165/292
See application file for complete search history.

(56) References Cited

U.S. PATENT DOCUMENTS

| | | |
|---|---|---|
| 5,247,991 A | 9/1993 | Polcer |
| 5,517,822 A | 5/1996 | Haws et al. |
| 5,778,657 A | 7/1998 | Ohtomo et al. |
| 5,938,975 A | 8/1999 | Ennis et al. |
| 6,668,537 B1 | 12/2003 | Hays |
| 8,171,993 B2 | 5/2012 | Hefley |
| 9,121,257 B2 | 9/2015 | Coli et al. |
| 9,140,110 B2 | 9/2015 | Coli et al. |
| 9,435,175 B2 | 9/2016 | Chong et al. |
| 9,475,020 B2 | 10/2016 | Coli et al. |
| 9,475,021 B2 | 10/2016 | Coli et al. |
| 9,534,473 B2 | 1/2017 | Morris et al. |
| 9,611,728 B2 | 4/2017 | Oehring |
| 9,995,218 B2 | 6/2018 | Oehring et al. |
| 10,107,084 B2 | 10/2018 | Coli et al. |
| 10,107,085 B2 | 10/2018 | Coli et al. |
| 10,221,668 B2 | 3/2019 | Coli et al. |
| 10,227,855 B2 | 3/2019 | Coli et al. |
| 10,502,042 B2 | 12/2019 | Coli et al. |
| 10,648,312 B2 | 5/2020 | Coli et al. |
| 10,689,961 B2 | 6/2020 | Coli et al. |
| 10,718,194 B2 | 7/2020 | Coli et al. |
| 10,724,353 B2 | 7/2020 | Coli et al. |
| 10,774,630 B2 | 9/2020 | Coli et al. |
| 10,837,270 B2 | 11/2020 | Coli et al. |
| 10,851,634 B2 | 12/2020 | Coli et al. |
| 10,876,386 B2 | 12/2020 | Coli et al. |
| 10,895,138 B2 | 1/2021 | Coli et al. |
| 2003/0057704 A1 | 3/2003 | Baten et al. |
| 2003/0079479 A1 | 5/2003 | Kristich et al. |
| 2006/0042259 A1 | 3/2006 | Marushima et al. |
| 2007/0256424 A1 | 11/2007 | Briesch et al. |
| 2011/0185702 A1 | 8/2011 | Bilton et al. |
| 2014/0039708 A1 | 2/2014 | Curtis et al. |
| 2014/0060774 A1 | 3/2014 | Motakef et al. |
| 2014/0096974 A1 | 4/2014 | Coli et al. |
| 2015/0068724 A1 | 3/2015 | Coli et al. |
| 2015/0083235 A1 | 3/2015 | Larson |
| 2015/0300145 A1 | 10/2015 | Coli et al. |
| 2015/0314255 A1 | 11/2015 | Coli et al. |
| 2016/0061061 A1 | 3/2016 | Ekanayake et al. |
| 2016/0102612 A1 | 4/2016 | Kaufman |
| 2016/0177675 A1 | 6/2016 | Morris et al. |
| 2016/0208593 A1 | 7/2016 | Coli et al. |
| 2016/0208594 A1 | 7/2016 | Coli et al. |
| 2016/0326855 A1 | 11/2016 | Coli et al. |
| 2016/0369609 A1 | 12/2016 | Morris et al. |
| 2017/0036178 A1 | 2/2017 | Coli et al. |
| 2017/0037718 A1 | 2/2017 | Coli et al. |
| 2017/0104389 A1 | 4/2017 | Morris et al. |
| 2017/0259227 A1 | 9/2017 | Morris et al. |
| 2018/0363434 A1 | 12/2018 | Coli et al. |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0055827 A1 | 2/2019 | Coli et al. |
| 2019/0112908 A1 | 4/2019 | Coli et al. |
| 2019/0271218 A1 | 9/2019 | Coli et al. |
| 2019/0277125 A1 | 9/2019 | Coli et al. |
| 2019/0277126 A1 | 9/2019 | Coli et al. |
| 2019/0277127 A1 | 9/2019 | Coli et al. |
| 2019/0277128 A1 | 9/2019 | Coli et al. |
| 2020/0318467 A1 | 10/2020 | Coli et al. |
| 2020/0347710 A1 | 11/2020 | Coli et al. |
| 2020/0347711 A1 | 11/2020 | Coli et al. |

FOREIGN PATENT DOCUMENTS

| | | | |
|---|---|---|---|
| AR | 104823 A2 | | 8/2017 |
| AR | 104824 A2 | | 8/2017 |
| AR | 104825 A2 | | 8/2017 |
| AR | 104826 A2 | | 8/2017 |
| CA | 2955706 A1 | | 10/2012 |
| CA | 2773843 C | | 1/2016 |
| CA | 2835904 C | | 2/2017 |
| CA | 2845347 C | | 6/2017 |
| CA | 2900387 C | | 9/2018 |
| CN | 205047285 U | * | 2/2016 |
| EP | 2904200 A1 | | 8/2015 |
| EP | 2726705 B1 | | 8/2018 |
| EP | 3444430 A1 | | 2/2019 |
| EP | 3444431 A1 | | 2/2019 |
| EP | 3444432 A1 | | 2/2019 |
| EP | 3447239 A1 | | 2/2019 |
| EP | 3453827 A2 | | 3/2019 |
| EP | 3456915 A1 | | 3/2019 |
| KR | 101516396 B1 | * | 5/2015 |
| MX | 358054 B | | 8/2018 |
| MX | 362628 B | | 1/2019 |
| MX | 365888 B | | 6/2019 |
| MX | 365889 B | | 6/2019 |
| MX | 366049 B | | 6/2019 |
| WO | WO2013025023 | * | 2/2013 |
| WO | WO2013025023 A2 | * | 2/2013 |
| WO | WO 2014/053056 A1 | | 4/2014 |

OTHER PUBLICATIONS

Firestream Water Heaters for Fracking, www.heatec.com, Oct. 18, 2017, 4 pages.

Frac Tank Heating, McAdaFluidsHeatingServices, mcadafluidsheating.com/frac-tank-heating, Oct. 18, 2017, 2 pages.

"Frac Water Heater", www.alliedoilfield.com, Oct. 18, 2017, 3 pages.

Kraken Tri-Fuel Superheater Technology, Aggreko, Oct. 18, 2017, 2 pages.

PCT International Search Report and Written Opinion, PCT Application No. PCT/US2018/068103, May 7, 2019, 11 pages.

\* cited by examiner

EXHAUST HEAT RECOVERY FROM A MOBILE POWER GENERATION SYSTEM

CROSS-REFERENCE TO RELATED APPLICATION

This application is a continuation of U.S. patent application Ser. No. 17/212,968, filed Mar. 25, 2021, which is a continuation of U.S. patent application Ser. No. 16/236,734 (Now U.S. Pat. No. 10,962,305), filed Dec. 31, 2018, which claims the benefit of U.S. Provisional Application No. 62/612,986, filed Jan. 2, 2018. The content of each of the above reference applications is incorporated herein by reference in their entirety.

BACKGROUND

Hydraulic fracturing has been commonly used by the oil and gas industry to stimulate production of hydrocarbon producing wells, such as oil and/or gas wells. Hydraulic fracturing, sometimes called "fracing" or "fracking" is the process of injecting fracturing fluid, which is typically a mixture of water, proppants (e.g., sand, fracturing sand, ceramics and resin coated materials), and chemicals, into the wellbore to fracture subsurface geological formations and release hydrocarbon reserves. The fracturing fluid is pumped into a wellbore at a pressure to cause fissures within the underground geological formations. Once inside the wellbore, the pressurized fracturing fluid flows into the subsurface geological formation to fracture the underground formation. The fracturing fluid may include water, various chemical additives, and proppants that promote the extraction of hydrocarbon reserves, such as oil and/or gas. Proppants, such as fracturing sand, prevent the fissures and fractures created in the underground formation from closing, and allow the formation to remain open so that the hydrocarbon reserves are able to flow to the surface.

A base fluid for creating fracturing fluid, such as water, possesses certain properties that dictate the base fluid's effectiveness in hydraulic fracturing operations. Examples of properties that influence a base fluid's effectiveness include mineral content (e.g., total dissolved solids such as iron, chlorides, and sulfides), potential of hydrogen (pH), alkalinity, bacterial content, and temperature. If the available base fluid fails to meet one or more of these criteria, then operators may adjust the water's properties prior to and/or during the fracturing fluid creation process. For example, an operator may adjust the base fluid's properties by implementing filtering processes (e.g., filter media or osmosis), performing chemical alterations (e.g., the addition of acids, bases, or biocides) and/or transferring thermal energy (e.g., a propane or diesel fired heat exchanger) to the base fluid. Typically, the volume of base fluid an operator uses in a fracturing operation can be as high as about 4,000,000 gallons per day. Therefore, to adjust the base fluid's properties, whether to filter, chemically alter, or heat water, can be a relatively large-scale operation.

In one example, assuming the base fluid is water, controlling water temperature within a certain range is important when operators treat the water in hydraulic fracturing operations with gelling agents, such as guar gum, xanthan gum, hydroxyethyl cellulose, or poly-acrylamide. One reason to treat the water with gelling agents is to achieve a desired viscosity that generates an intended fracture propagation and/or carry proppants designed to hold fractures in surrounding rock formations open post-treatment. To properly treat the water with the gelling agents, operators may manage the water's temperature to be within a certain range. If the water's temperature is outside the optimal range, operators may apply additional volumes of gelling agents and other chemicals to water to achieve the desired viscosity. Unfortunately, using additional volumes of gelling agents adversely affects the economics of the treatment projects and leads to unnecessary waste of resources. In certain situations, if the water's temperature is excessively low, an operator may be unable to achieve a desired viscosity for the fracturing fluid.

In addition to possible viscosity issues, base fluid temperatures that fall below a certain temperature could damage tubulars and/or casing that provides the integrity of the wellbore. As an example, if relatively large quantities of fracturing fluid with temperature below the certain temperature is injected into the wellbore, the tubulars could experience sudden detrimental thermal compression based on the thermal expansion properties of the steel. Specifically, a 30-degree Fahrenheit (° F.) drop in the fracturing fluid's average temperature over the length of 18,000 feet of casing in a wellbore could result in enough force to cause the casing to compress about five feet. The resulting compression could cause added tension within the various tubular strings that unset packer assemblies and casing hangers, damage wellbore cement sealing integrity, and/or even part the casing or tubing strings. Accordingly, injecting relatively large quantities of fracturing fluid at relatively low temperatures could damage a well's integrity and lead to costly repairs, safety risks, and possible environmental damage to ground water. Therefore, being able to efficiently manage the temperature of fracturing fluid remains valuable in fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one or more embodiments, a system for heating source fluid, comprising: a turbine-electric generator transport comprising: an inlet plenum and an exhaust collector; a turbine connected to the inlet plenum and the exhaust collector; and an electric-generator coupled to the turbine; an exhaust heat recovery transport comprising: a combustion air connection coupled to the inlet plenum; an exhaust air connection coupled to the exhaust collector; a heat transfer assembly coupled to the exhaust air connection; and a fluid system coupled to the heat transfer assembly; an inlet and exhaust transport comprising: an air inlet filter housing coupled to the combustion air connection; and an exhaust stack coupled to the exhaust air connection.

In another embodiment, a method for heating source fluid, the method comprising: receiving, at a heat transfer assembly of an exhaust heat recovery transport, exhaust air from a turbine-electric generator system, measuring an incoming temperature and flow rate for a source fluid, pumping the source fluid in the heat transfer assembly at a pressure based on the temperature and the flow rate of the exhaust air and the incoming temperature and the flow rate for the source fluid, transferring, within the heat transfer assembly, thermal energy from the exhaust air to the source fluid to generate a heated source fluid, and discharging the heated source fluid from the heat transfer assembly.

In yet another embodiment, an exhaust heat recovery transport comprising: a combustion air connection configured to provide combustion air to an inlet plenum of a power generation system, an exhaust air connection configured to receive exhaust air from an exhaust collector of the power generation system, a heat transfer assembly configured to transfer thermal energy from the exhaust air to a source fluid to generate a heated source fluid, and one or more pump assemblies coupled to a fluid system and driven by one or more electric motors, wherein the one or more pump assemblies are configured to: pump the source fluid into the heat transfer assembly via the fluid system at a pressure based on a temperature and a flow rate of the exhaust air and an incoming temperature for the source fluid and discharge the heated source fluid from the heat transfer assembly via the fluid system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "fracturing sand," as used within this disclosure, serves as a non-limiting example of a proppant used as a component of fracturing fluid. "Fracturing sand" is also used herein to collectively refer to both wet and dry fracturing sand. Embodiments in this disclosure are not limited to fracturing sand and any other type of proppant, such as man-made ceramics, aluminum beads, resin-coated sands, and sintered bauxite, can be used with the various embodiments presented in the disclosure. Unless otherwise specified within the disclosure, the term "fracturing sand" can be interchanged throughout this disclosure with the term "proppants."

As used herein, the term "transport" refers to any transportation assembly, including, but not limited to, a trailer, truck, skid, rail car, and/or barge used to transport relatively heavy structures and/or other types of articles, such as fracturing equipment and fracturing sand.

As used herein, the term "trailer" refers to a transportation assembly used to transport relatively heavy structures and/or other types of articles (such as fracturing equipment and fracturing sand) that can be attached and/or detached from a transportation vehicle used to pull or move the trailer. In one or more embodiments, the trailer may include mounts and manifold systems to connect the trailer to other fracturing equipment within a fracturing system or fleet.

Various example embodiments are disclosed herein that capture and utilize exhaust heat from a mobile power generation system to heat source fluid "on-the-fly." In one or more embodiments, the mobile power generation system contains a turbine-electric generator system that generates exhaust heat as a by-product of producing electric power. An exhaust heat recovery system is configured to couple to the turbine-electric generator system to receive and utilize the exhaust heat for heating up fluids flowing through the exhaust heat recovery system. For example, the exhaust heat recovery system could include heat exchanger coils that allow source fluid (e.g., water) to flow through. As the source fluid flows within and through the heat exchanger coils, the exhaust heat recovery system transfers thermal energy without transforming all of the source fluid into a gaseous state (e.g., steam). The heat exchanger coils are able to run dry, which refers to being able to receive exhaust heat while the source fluid is not flowing through the heat exchanger coils. In other words, water or some other type of fluid does not need to continuously flow through the heat exchanger coils to prevent melting or other damage when the heat exchanger coils are thermally heated by the exhaust heat.

To control and manage source fluid temperature, the exhaust heat recovery system contains one or more pump assemblies, electric motors to drive the pump assemblies, one or more control drives to control and manage the electric motors (e.g., variable frequency drives (VFDs)), and one or more control valves that regulate the source fluid flow rate, flow path, and temperature. The control drives and control valves may be part of or communicate with a control system that regulates the temperate of the source fluid. Specifically, the control system regulates the fluid flow rate and temperature based on the exhaust heat output of the turbine-electric generator system and the measured temperature of the source fluid. The heated fluid is then discharged out of an outlet manifold to provide the heated fluid to one or more destinations. For example, in a hydraulic fracturing context, the exhaust heat recovery system may provide heated source water to fluid storage equipment (e.g., fracture tanks or a fracturing pond), a hydration unit, a blender unit, a hydration-blender unit, and/or other hydraulic fracturing equipment.

Figure 1:
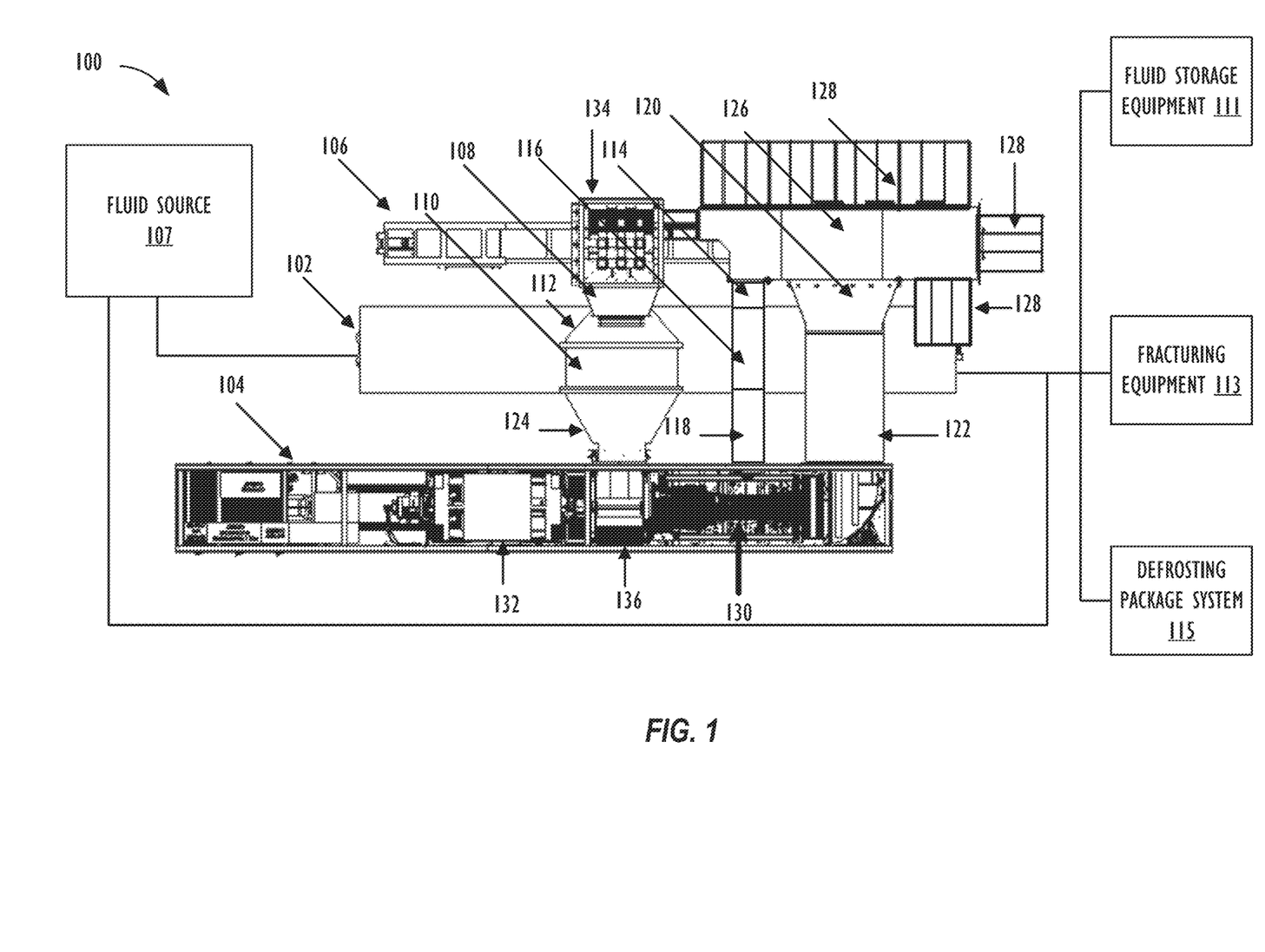
FIG. 1 is a top-down view of an embodiment of a mobile power generation system that includes an exhaust heat recovery system for transferring thermal energy to a source fluid.

FIG. 1 is a top-down view of an embodiment of a mobile power generation system 100 that includes an exhaust heat recovery transport 102 for transferring thermal energy to a source fluid (e.g., water). The mobile power generation system 100 simplifies and minimizes the operations for the mobilization and de-mobilization process by utilizing transports dedicated to generate electric power. As shown in FIG. 1, the mobile power generation system 100 contains a turbine-electric generator transport 104 that generates electric power from one or more different types of hydrocarbon fuels (e.g., natural gas, compressed natural gas, liquefied natural gas, diesel, gasoline, etc.). The turbine-electric generator transport 104 includes a turbine 130 that compresses and mixes combustion air with hydrocarbon fuels to spin and generate mechanical energy. The mechanical energy is then transferred to drive an electric generator 132 that converts the mechanical energy into electricity (e.g., alternating current (AC) electric power). As used herein, the term "electric generator" may be interchanged and generally referred to as an "alternator" throughout this disclosure. Additionally, the term "turbine" may be interchanged and generally referred to as a "gas turbine" throughout this disclosure.

An inlet and exhaust transport 106 provides ventilation and combustion air to the turbine-electric generator transport 104 so that the turbine 130 is able to generate mechanical energy. The inlet and exhaust transport 106 also collects exhaust air from the turbine-electric generator transport 104 and utilizes a turbine exhaust stack 134 to ventilate and disperse the collected exhaust air into the atmosphere. In one or more embodiments, the turbine exhaust stack 134 includes a plurality of silencers that reduce the noise generated from ventilating the collected exhaust air. The silencers are able to reduce the noise of the air movement to no greater than about 85 decibels of sound. In FIG. 1, the inlet and exhaust transport 106 also includes hinged weather hoods 128 configured to protect the inlet and exhaust transport 106 from dust, water, and other external environmental conditions. The weather hoods 128 can be closed and locked via hinge when the inlet and exhaust transport 106 is converted back into transportation mode. Examples of a turbine-electric generator transport 104 and an inlet and exhaust transport 106 are discussed and shown in more detail in U.S. Pat. No. 9,534,473, filed Dec. 16, 2015 by Jeffrey G. Morris et al. and entitled "Mobile Electric Power Generation for Hydration Fracturing of Subsurface Geological Formations," which is hereby incorporated by reference as if reproduced in its entirety.

To heat source fluid, an exhaust heat recovery transport 102 is connected to the turbine-electric generator transport 104 and the inlet and exhaust transport 106 using a combustion air connection, one or more ventilation air connections, and an exhaust air connection. As shown in FIG. 1, the combustion air connection is formed from the inlet combustion expansion connector 120 and the heat recovery combustion connector 122. The heat recovery combustion connector 122 connects the inlet plenum of the turbine-electric generator transport 104 to the inlet combustion expansion connector 120 mounted on the inlet and exhaust transport 106. The ventilation air connection contains the inlet ventilation expansion connection 114 and the heat recovery ventilation connectors 116 and 118. The heat recovery ventilation connector 118 connects to the enclosure ventilation inlet of the turbine-electric generator transport 104 and the heat recovery ventilation connector 116 connects to the inlet ventilation expansion connection 114 of the inlet and exhaust transport 106. The exhaust air connection includes the exhaust expansion connector 108 and the heat recovery exhaust connectors 112 and 124. The heat recovery exhaust connector 124 connects to the turbine-electric generator's 104 exhaust collector 136, and the heat recovery exhaust connector 112 connects to the exhaust expansion connector 108 mounted on the inlet and exhaust transport 106.

Based on the combustion air connection and ventilation air connection, the turbine 130 is able to convert chemical energy from hydrocarbon fuel (e.g., natural gas or diesel) to mechanical energy. The inlet combustion expansion connector 120 and the heat recovery combustion connector 122 connect the inlet and exhaust transport 106 to the inlet plenum of the turbine-electric generator transport 104 to supply filtered air for turbine combustion. The inlet ventilation expansion connection 114 and the heat recovery ventilation connectors 116 and 118 provide air from the inlet and exhaust transport 106 to cool the enclosure that surrounds the turbine 130 in order to dissipate heat produced from the turbine. For example, the inlet ventilation expansion connection 114 may include fans to direct air into the enclosure ventilation inlet to cool the enclosure that surrounds the turbine 130. The inlet ventilation expansion connection 114 may also include silencers to reduce the noise of the air movement to no greater than about 85 decibels of sound. The exhaust expansion connector 108 and the heat recovery exhaust connectors 112 and 124 are able to collect and divert exhaust air from the turbine-electric generator transport 104. As shown in FIG. 1, the heat transfer assembly 110 is located within heat recovery exhaust connectors 112 to transfer thermal energy from the exhaust air to source fluid. Other embodiments could have the heat transfer assembly 110 in other locations of the exhaust air flow path.

A byproduct of the turbine-electric generator transport 104 is exhaust air that can range from of about 600 degrees Fahrenheit (° F.) to about 1100° F. (e.g., about 315 degrees Celsius (° C.) to about 594° C.). FIG. 1 illustrates that the exhaust heat recovery transport 102 is positioned between the turbine-electric generator transport 104 and the inlet and exhaust transport 106 to receive exhaust air from the turbine-electric generator transport 104 to heat source fluid from fluid source 107. Although not shown in FIG. 1, besides the different connectors and heat exchanger assemblies, the exhaust heat recovery transport 102 may also include one or more electric motors that drive one or more pump assemblies and a control system that includes a controller (e.g., a programmable logic controller (PLC)) for regulating the temperature increase of source fluid from fluid source 107 and one or more control drives (e.g., VFDs) that control and manage the electric motors. In one or more embodiments, the exhaust heat recovery transport 102 can utilize the electric motors to drive one or more pump assemblies (not shown in FIG. 1) to pump source fluid from fluid source 107 to the exhaust heat recovery transport 102. The exhaust air from the turbine-electric generator transport 104 provides thermal energy to one or more heat conducting elements, such as heat exchanger coils. Within the heat transfer assembly 110, the source fluid traverses through the heat conducting elements to heat the source fluid to a target temperature without transforming all of the source fluid into a gaseous state (e.g., steam). Afterwards, the exhaust heat recovery transport 102 discharges the source fluid to one or more destinations.

Additionally or alternatively, the mobile power generation system 100 may include an ambient air heating system to prevent icing of the air inlet filter housing 126 and/or combustion air provided to the turbine 130. In certain situations, the mobile power generation system 100 may be operating within an external environment that has relatively low ambient air temperature. As an example, hydraulic fracturing operations may occur in seasonally cold time periods or relatively colder environments where ambient air temperatures are below freezing temperatures. When this occurs, the air inlet filter housing 126 and/or other portions of the inlet and exhaust transport 106 may freeze and ice over, and thus could prevent the turbine 130 from operating in a desirable state. To prevent freezing or icing over, the ambient air heating system contains a second heat exchanger assembly (not shown in FIG. 1) mounted within the heat recovery combustion connector 122 to heat up the combustion air exiting the air inlet filter housing 126. The ambient air heating system may also include heat conducting elements, such as heating coils that attach to the weather hoods 128. The heat conducting elements could have heated fluid flowing through them to warm the ambient air surrounding the air inlet filter housing 126. As an example, the heated fluid may be heated source fluid from the exhaust heat recovery transport 102, from other heating equipment, or both. The heated fluid flowing through the heat conducting elements of the ambient air heating system include, but are not limited to, water, or a water glycol mixture (e.g., 50% water, 50% glycol). Other embodiments of the ambient air heating system could include heat conducting elements that utilize heated air to warm the ambient air surrounding the air inlet filter housing 126.

In one or more embodiments, the heat transfer assembly 110 for the exhaust heat recovery transport 102 may be a heat exchanger configured to run dry. Stated another way, the heat transfer assembly 110 is able to operate and receive exhaust air from the turbine-electric generator transport 104 without receiving source fluid from fluid source 107 and/or having source fluid flowing through the heat transfer assembly 110. To be able to run dry, the heat transfer assembly 110 includes heat exchanger coils made with material that is able to withstand the high temperature of the exhaust air, which may range from about 600° F. to about 1100° F. For instance, the heat exchanger coils may be made from a P22/T22 material to form alloy steel tubes suitable to withstand high-temperature environments (e.g., up to about 1400° F.). The heat transfer assembly's 110 ability to run dry also supports the ability to heat source fluid on-the-fly or in real-time.

Being able to have the heat transfer assembly 110 run dry allows an operator to shut off the pump assembly when the source fluid does not need to be dispersed to other destinations. Without the ability to run dry, the exhaust heat recovery transport 102 may need to continuously pump source fluid through the heat transfer assembly and utilize diverter valves to divert the flow of the source fluid to one or more residual destinations. Adding diverter valves on the exhaust heat recovery transport 102 could consume too much space and may not fit within a limited space environment. For instance, for mobility purposes, the mobile power generation system 100 may be designed according to specific space and/or weight restrictions that prevents the use of diverter valves.

The mobile power generation system 100 with the exhaust heat recovery transport 102 may have a variety of use cases, such as fracturing operations at a well site. The exhaust heat recovery transport 102 can send and provide heated source fluid to one or more destinations on and/or off the well site. Using FIG. 1 as an example, the exhaust heat recovery transport 102 is able to send heated source fluid back to the fluid source 107 (e.g., a water source), to fluid storage equipment 111 located on the well site (e.g., water storage tank or fracturing tank), fracturing equipment 113 (e.g., a blender unit, a hydration unit or a hydration-blender unit), and defrosting package system 115. The fluid source 107 could correspond to some type of storage facility, such as a water pit or pond that may be located offsite of the well site. Additionally or alternatively, the heated source fluid (e.g., water) could be sent to a defrosting package system 115 to thaw a variety of other equipment located at the wellsite, such as wellheads, fracturing pipes, etc. For example, the heated source fluid may be combined with other chemicals or liquids (e.g. glycol) to form a mixture (e.g., water glycol mixture) that travels through climate hoses and/or other flexible tubing that wrap around pipes and/or other equipment at the wellsite. The heat from the source fluid would provide thermal energy that thaws the equipment at the wellsite.

Although FIG. 1 illustrates a specific embodiment of mobile power generation system 100 that includes an exhaust heat recovery transport 102 to generate heated source fluid for a fracturing operation, the disclosure is not limited to the specific embodiment illustrated in FIG. 1. For instance, the mobile power generation system 100 and the exhaust heat recovery transport 102 is not limited to fracturing operations and may be applicable to a variety of other industry fields, such as power generation. The exhaust heat recovery transport 102 could also include other components not explicitly shown in FIG. 1 that are known by persons of ordinary skill in the art and typically associated with building and operating a heat transfer assembly 110, such as a heat exchanger, and/or pump assemblies. Additionally, the exhaust heat recovery transport 102 may include one or more fluid control valves that regulate heated source fluid flow rate and/or have incoming source fluid bypass the heat transfer assembly 110 to blend with the heated source fluid temperature. The use and discussion of FIG. 1 is only an example to facilitate ease of description and explanation.

Figure 2:
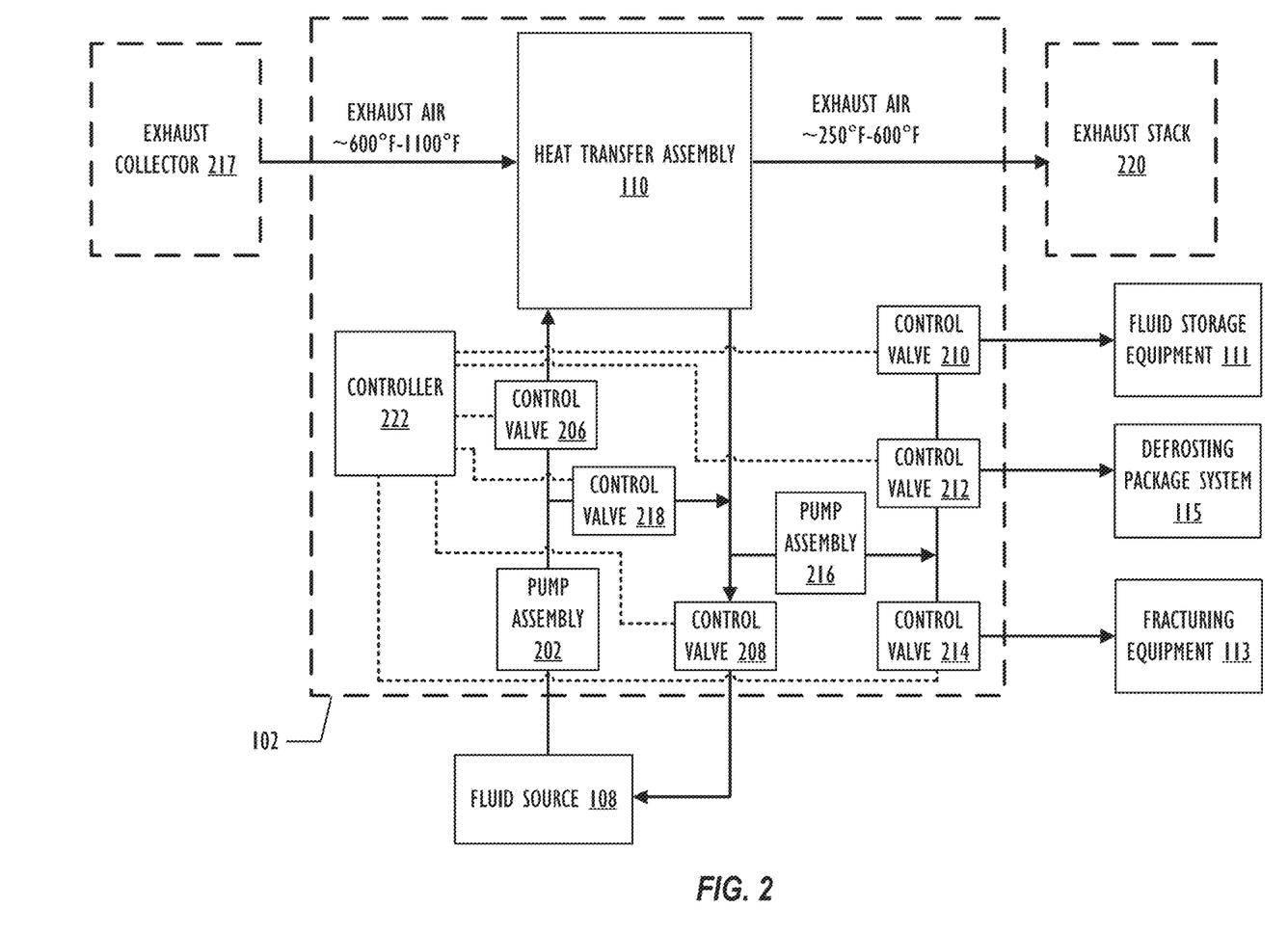
FIG. 2 is a block diagram for the exhaust heat recovery transport.

FIG. 2 is a block diagram of the exhaust heat recovery transport 102. The heat transfer assembly 110 receives exhaust air from the exhaust collector 217 of the turbine-electric generator transport, where the exhaust air ranges in temperature from about 600° F. to about 1100° F. One of the reasons the turbine-electric generator transport produces exhaust air with varying temperatures is because of the varying load the turbine-electric generator transport supplies power to. Moreover, the exhaust air flow rate for the turbine-electric generator transport may also vary depending on the amount of power load. In particular, as the power load for the turbine-electric generator transport increases, so does the temperature and flow rate of the exhaust air. For example, when the turbine-electric generator transport experiences a zero percent power load, the temperature of the exhaust air could be about 600° F. and have an exhaust air flow rate of about 180,000 pounds per hour (lbs/hr). If the turbine-electric generator transport experiences about a 60 percent power load, the temperature of the exhaust air is about 880° F. with an exhaust air flow rate of about 570,000 (lbs/hr). Stated another way, for a fracturing operation context, when the turbine-electric generator transport is providing electric power to drive more pump assemblies, the turbine-electric generator transport provides more British thermal units (BTUs) than when the turbine-electric generator transport provides no electric power or the number of pump assemblies in use decreases. The temperature and flow rate of the exhaust air, thus, varies depending on the power load.

The exhaust heat recovery transport 102 utilizes a pump assembly 202 and control valve 206 to adjust the pumping pressure and flow rate of the source fluid into the heat transfer assembly 110 to obtain a desired or specific temperature for the source fluid. In FIG. 2, the pump assembly 202 is configured to pump the source fluid into the heat transfer assembly 110 via control valve 206 based on a measured incoming temperature of the source fluid and a determined temperature and flow rate of the exhaust air. The temperature and flow rate of the exhaust air may be derived from the current power load of the turbine-electric generator transport and/or measured based on one or more sensors (e.g., flow meters and temperature sensors). For example, if the turbine-electric generator transport experiences about a 60 percent power load as discussed above, the heat transfer assembly 110 can heat source fluid that is initially fed in at about 50° F. to a temperature of about 80° F. with an average heated source fluid flow rate of about 1,800,000 lbs/hr. The exhaust heat recovery transport 102 then adjusts the source fluid's flow rate and/or inlet pressure into the heat transfer assembly 110 by adjusting the pump assembly's 202 pumping pressure and/or control valve 206. The heat transfer assembly 110 heats the source fluid to a desired or specific temperature (e.g., 80° F.) as the source fluid traverses through the heat exchanger assembly's 110 heat conduction elements (e.g., heat exchanger coils). The pumping pressure and the source fluid's flow rate into the heat transfer assembly 110 may vary over the course of a fracturing operation.

After the heat transfer assembly 110 increases the temperature of the incoming source fluid to a desired or specific temperature, a second pump assembly 216 may be configured to discharge the heated source fluid out of the heat transfer assembly 110. The second pump assembly 216 may pump the heated source fluid to the output manifold, which then may discharge to one or more destinations, such as fluid storage equipment 111 (e.g., water pit, water pond, and fracturing tanks), other fracturing equipment, defrosting package system 115, back to the fluid source 107, and/or the inlet and exhaust transport's ambient air heating system. In FIG. 2, control valves 208, 210, 212, and 214 are added within the exhaust heat recovery transport 102 to direct the heated source fluid to the different destinations. For instance, control valve 212 may be in a closed position and control valve 214 may be an open position to direct heated source fluid to the fracturing equipment 113. Other embodiments of the exhaust heat recovery transport 102 could utilize a single pump assembly (e.g., pump assembly 202) or more than two pump assemblies to pump source fluid into and out of the heat transfer assembly 110.

FIG. 2 also illustrates that temperature of the exhaust air reduces as the exhaust air exits the heat transfer assembly 110 and enters the exhaust stack 220 of the inlet and exhaust transport. The temperature of the exhaust air that exits the heat transfer assembly 110 may range from about 250° F. to about 600° F. depending on the turbine-electric generator transport's power load. In one example, at a zero percent power load, the exhaust air exiting the heat transfer assembly 110 may be about 250° F. while at a 60 percent power load, the exhaust air exiting the heat transfer assembly 110 may be about 520° F. Variation of the temperature of the exhaust air when existing the heat transfer assembly 110 can originate from the incoming temperature of the exhaust air, the flow rate of the exhaust air, the incoming temperature for the source fluid, and/or the flow rate of the source fluid.

The exhaust heat recovery transport 102 is also able to regulate incoming source fluid using control valve 218. The exhaust heat recovery transport 102 may adjust control valve 218 so that incoming source fluid is able to bypass the heat transfer assembly 110. The control valve 218 regulates the flow rate or amount of incoming source fluid that bypasses the heat transfer assembly 110. The exhaust heat recovery transport 102 may utilize the control valve 218 to mix the incoming source fluid with a relatively lower temperature with heated source fluid discharging from the heat transfer assembly 110. As an example, an operator may want to have the heated source fluid at a target temperature of about 65° F. However, based on the turbine-electric generator transport's current operating condition, the heat source fluid exiting the heat transfer assembly 110 is about 80° F. The exhaust heat recovery transport 102 may output a heated source fluid with a temperature of about 65° F. by mixing the incoming source fluid with a relatively lower temperature (e.g., 50° F.) with the heated source fluid with a relatively higher temperature (e.g., 80° F.). Additionally or alternatively, the exhaust heat recovery transport 102 may also use the control valve 218 to bypass the heat transfer assembly 110, for example, when the incoming source fluid has already reached a desired or target temperature.

In one or more embodiments, the pump assemblies 202 and 216 may be driven by one or more electric motors. As an example, exhaust heat recovery transport 102 pump assemblies 202 and 216 may be driven by single electric motor or may be driven by two separate electric motors. Examples of electric motors the exhaust heat recovery transport 102 may utilize include induction motors and/or permanent magnet motors. The exhaust heat recovery transport 102 may also include a control system with one or more drives (e.g., VFDs) that monitor and control the electric motors. The electric motors may be powered using a 480 volt power supply that either may be fed from a transformer located on the exhaust heat recovery transport 102 or provided via a 480 volt electrical connection. For example, a transformer mounted on the exhaust heat recovery transport 102 is configured to receive a relative higher voltage (e.g., 13.8 kilovolts) via an electrical connection and step down the voltage level to 480 volts to power the electric motors. In another example, the exhaust heat recovery transport 102 may not have a mounted transformer and instead receive power via a 480 volt electrical connection directly from other equipment. Other embodiments of the exhaust heat recovery transport 102 could utilize other voltages to power the electric motor used to drive pump assemblies 202 and 216.

The control system may also include a controller 222 that communicates with control valves 206, 208, 210, 212, 214, and 218 and one or more drives (e.g., VFDs) to regulate the temperature increase for the source fluid and route heated source fluid. In FIG. 3, controller 222 communicates with control valve 206 and VFDs to monitor, control, and regulate the source fluid's flow rate into and/or discharge out of the heat transfer assembly 110. The controller 222 may be a PLC or include a PLC that receives sensor information, such as fluid flow rate from one or more flow meters, temperature from one or more resistance temperature detection (RTD) sensors, and pumping pressures from one or more pressure sensors and/or transmitters. Based on the sensor information and exhaust air temperature and flow rate, the controller 222 provides instructions to control valves 206 and 218 and the drives that control the electric motor. By doing so, the controller 222 modifies the source fluid's flow rate and/or pumping pressure to obtain a target temperature increase for the source fluid. Recall that the exhaust air temperature and flow rate can be derived from the current power load of the turbine-electric generator transport and/or measured based on one or more sensors (e.g., flow meters and temperature sensors). In one or more embodiments, controller 222 derives or receives sensor information for the exhaust air temperature and flow rate of the exhaust collector 217. Controller 222 also provides instructions to control valves 208, 210, 212, and 214 to route the heated source fluid and/or communicates with a data van via a network connection.

Figure 3A:
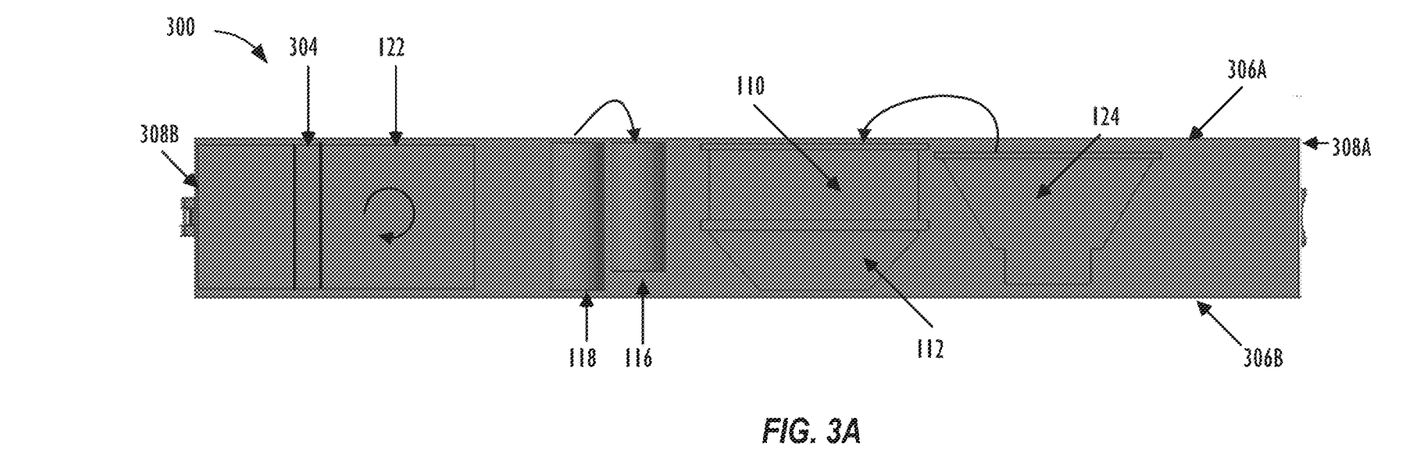
FIG. 3A is a block diagram of a top down view of the exhaust heat recovery transport 300 in transportation mode.

FIG. 3A is a block diagram of a top down view of the exhaust heat recovery transport 300 in transportation mode. The different connectors 112, 116, 118, 122, and 124, may be arranged and mounted on the exhaust heat recovery transport 300 in the specified manner shown in FIG. 3A so that the transport may fit within specified dimension that increase mobility of the exhaust heat recovery transport 300 during transportation mode. For example, to improve mobility over a variety of roadways, the exhaust heat recovery transport 300 may have a maximum height of about 13 feet and 6 inches, a maximum width of about 8 feet and 6 inches, and a maximum length of about 59 feet. However, the boundaries of the specified dimensions for the exhaust heat recovery transport 300 may not be adequate to properly connect the exhaust heat recovery transport 300 to the turbine-electric generator transport 104 and the inlet and exhaust transport 106 shown in FIG. 1. To provide the proper connections, one or more of the connectors 112, 116, 122, and 124 may be moved, extended, and/or aligned using hydraulics, pneumatics, and/or electric motors to transition into an operational mode.

In FIG. 3A, the heat recovery ventilation connectors 116 and 118 are mounted side-by-side to each other, and the heat recovery exhaust connectors 112 and 124 are mounted adjacent to each other on the exhaust heat recovery transport 300. The exhaust heat recovery transport 300 has two sides 306a and 306b that correspond to the longer-sides of the transport (e.g. the length of the transport) and two sides 308a and 308 that correspond to the two ends of the transport (e.g., the width of the transport). To fit within the transport's dimension, the sides of the heat recovery ventilation connectors 116 and 118 and the heat recovery exhaust connectors 112 and 124 that extend in a direction parallel to sides 308a and 308b have a shorter dimension than the sides of 308a and 308b. The heat recovery ventilation connector 116 and heat recovery exhaust connectors 112 may be mounted at a fixed location on the exhaust heat recovery transport 300. Conversely, the heat recovery ventilation connector 118 and heat recovery exhaust connectors 124 may be mounted to be moveable such that the heat recovery ventilation connector 118 is able to connect and seal with the heat recovery ventilation connector 116, and heat recovery exhaust connectors 124 is able to connect and seal with heat recovery exhaust connector 112. The heat recovery exhaust connector 124 may pivot using a duct turntable while the heat recovery ventilation connector 118 may have a duct sliding support frame. By doing so, the exhaust heat recovery transport 300 is able to elongate the ventilation air connection and the exhaust air connection for operational mode and shorten the connections when in transportation mode.

The heat recovery combustion connector 122 may be mounted on a turntable to rotate the connector when transitioning between the transportation mode and operational mode or vice versa. As shown in FIG. 3A, the heat recovery combustion connector 122 has at least two sides with different dimensions. Specifically, the heat recovery combustion connector's 122 sides that extend in a direction parallel with sides 306a and 306b are greater in length than the heat recovery combustion connector's 122 sides that extend in a direction parallel with sides 308a and 308b. The heat recovery combustion connector's 122 sides that are parallel with sides 308a and 308b are shorter than sides 308a and 308b. FIG. 3A also depicts that the recovery combustion connector 122 may include a heat transfer assembly 304 that is part of the ambient air heating system. The heat transfer assembly 304 may utilize the heated fluid to increase the temperature of the combustion air supplied to the turbine. In one or more embodiments, the heated fluid may be the heated source fluid discharged from the heat transfer assembly 110 and/or supplied from other heat transfer systems external to the exhaust heat recovery transport 300.

Figure 3B:
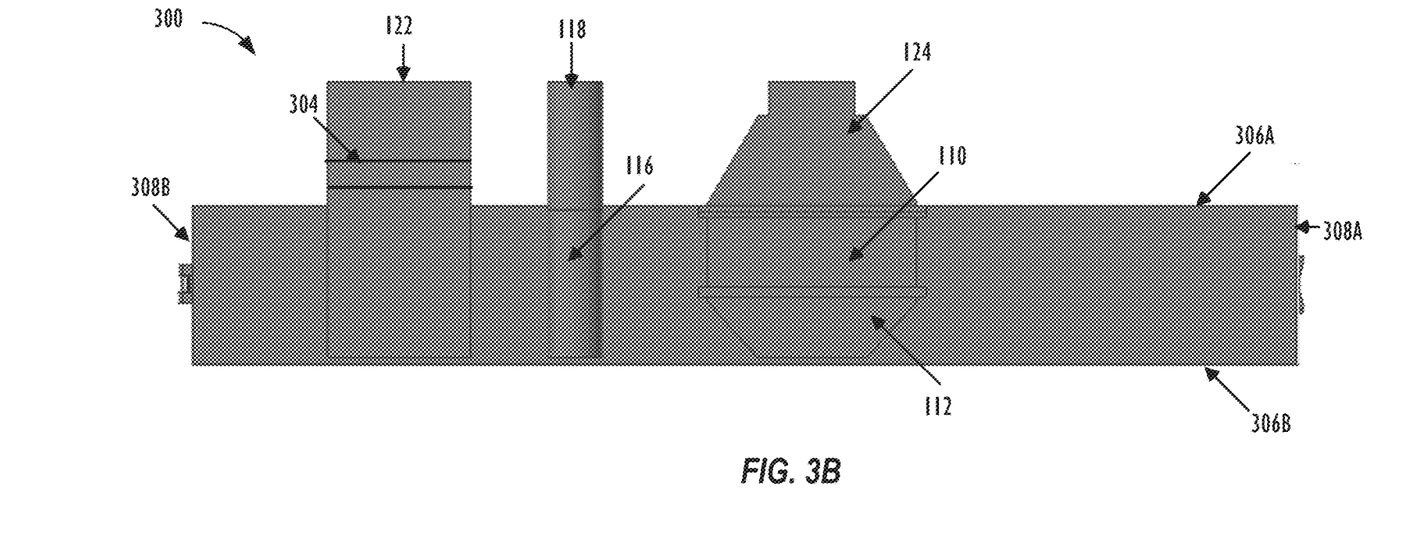
FIG. 3B is a block diagram of a top-down view of the exhaust heat recovery transport 300 in operational mode.

FIG. 3B is a block diagram of a top-down view of the exhaust heat recovery transport 300 in operational mode. To transition to operational mode, the heat recovery exhaust connector 124 pivots and turns using the duct turntable to connect and seal with the heat recovery exhaust connector 112. The heat recovery combustion connector 122 may rotate about 90 degrees such that the shorter side is about parallel with sides 306a and 306b and about perpendicular to sides 308a and 308b. The heat recovery ventilation connector 118 rotates to connect to the heat recovery ventilation connector 116. In one or more embodiments, to provide enough space for the heat recovery ventilation connector 118 to rotate, the exhaust heat recovery transport 300 may rotate the heat recovery combustion connector 122 to a specified position prior to having the heat recovery ventilation connector 118 connect and seal with the heat recovery ventilation connector 116. In other embodiments, rather than rotating, the heat recovery ventilation connector 118 could slide out or extend from the heat recovery ventilation connector 116 to connect the turbine-electric generator transport 104 to the inlet and exhaust transport 106 shown in FIG. 1 with the exhaust heat recovery transport 300.

FIG. 3B illustrates that the exhaust heat recovery transport 300 rotates and positions the connection extensions to protrude on a single side of the transport. Using FIG. 1 as an example, the exhaust heat recovery transport 300 moves the connectors so that the combustion air connection, ventilation air connection, and exhaust air connection protrude outward in a direction toward the turbine-electric generator transport. In other embodiments, the exhaust heat recovery transport 300 may move the different connectors to protrude on multiple sides of the exhaust heat recovery transport 300. In another embodiment, the connectors may protrude on the single side that faces the inlet and exhaust transport rather than the turbine-electric generator transport. To improve mobility of the exhaust heat recovery transport 300, the movement of the different connectors may be done without using external mechanical means, such as using a crane. To transition to operational mode from the transportation mode and vice versa, the different connectors may be positioned using hydraulics, pneumatics, and/or electric motors such that it aligns and connects with the turbine-electric generator transport and the inlet and exhaust transport.

Figure 4:
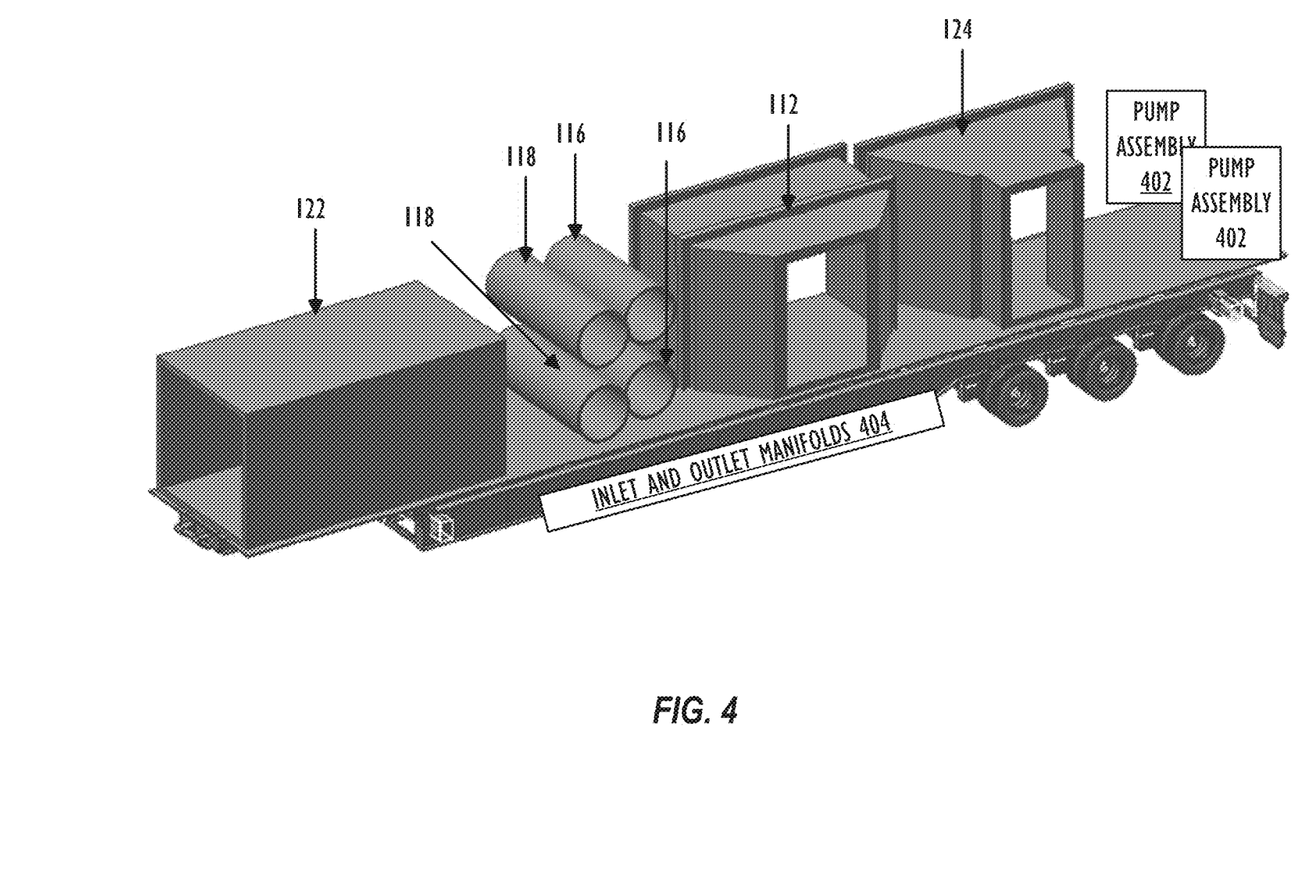
FIG. 4 is a side-profile view of an embodiment of the exhaust heat recovery transport in transportation mode.

FIG. 4 is a side-profile view of an embodiment of the exhaust heat recovery transport 400 in transportation mode. The side-profile view illustrates that exhaust heat recovery transport 400 is configured to mount two sets of heat recovery ventilation connectors 116 and 118 that form two ventilation air connections. The exhaust heat recovery transport 400 may also include one or more pump assemblies 402 located at the ends of the exhaust heat recovery transport 400. Additionally or alternatively, the pump assemblies 402 may be located at the sides of the exhaust heat recovery transport 400. As previously discussed, the pump assemblies 402 are responsible for supplying source fluid into the heat transfer assembly within the heat recovery exhaust connector 112 and/or discharge heated source fluid. To receive and/or discharge the source fluid, inlet and outlet manifolds 404 can be mounted underneath or within the transport frame at the sides of the exhaust heat recovery transport 400. The inlet and outlet manifolds 404 may be part of a fluid system that routes incoming source fluid to the heat transfer assembly, bypasses the heat transfer assembly, and/or mixes the incoming source fluid with heated source fluid exiting the heat transfer assembly. A general layout of the fluid system is described in FIG. 2. Additionally or alternatively, the inlet and outlet manifolds 404 may be located at one or both ends of the exhaust heat recovery transport 400 to receive incoming and/or discharge source fluid at and/or from the heat transfer assembly.

Figure 5:
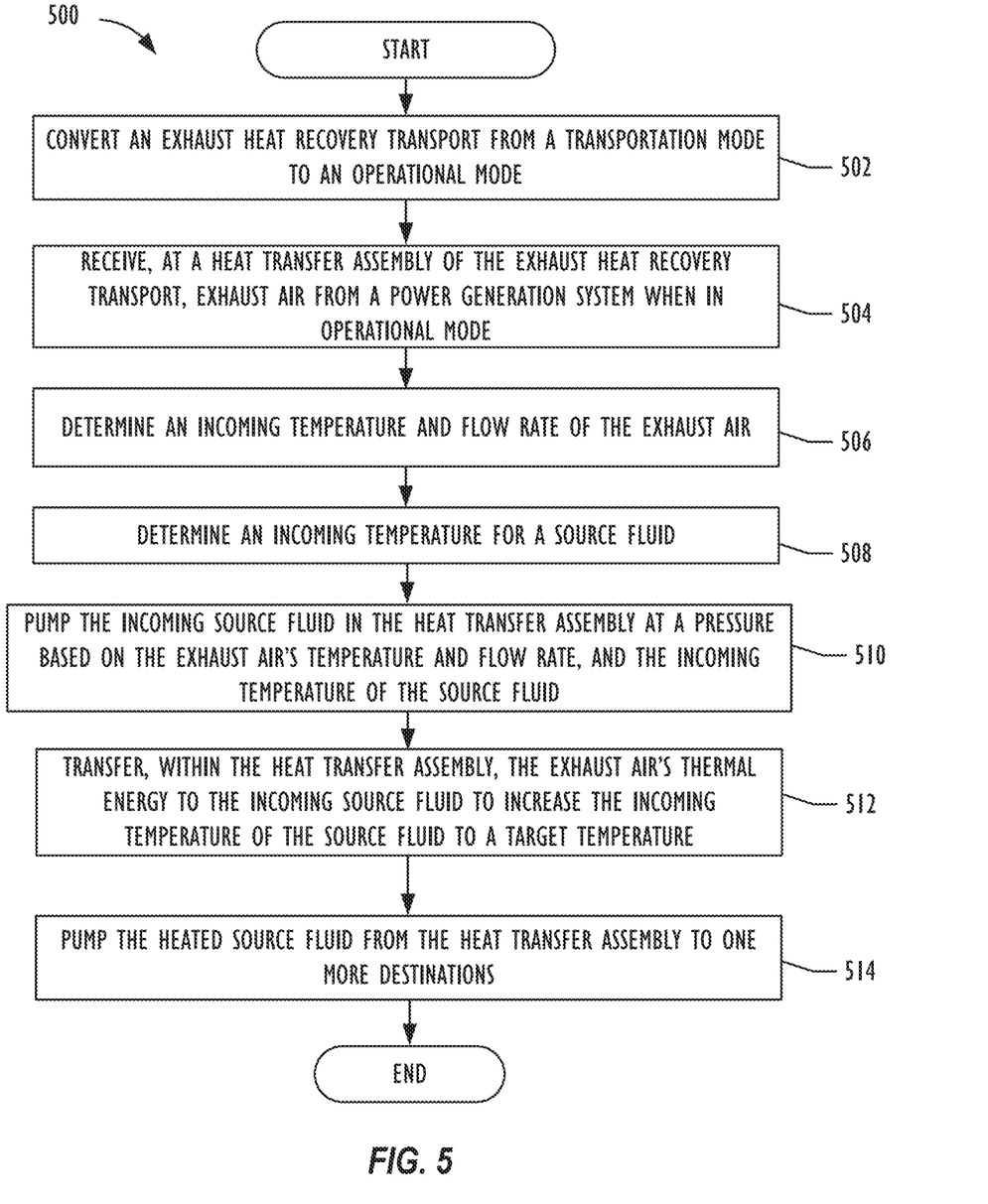
FIG. 5 is a flow chart of an embodiment of a method to recover exhaust heat for heating a source fluid.

FIG. 5 is a flow chart of an embodiment of a method 500 to recover exhaust heat for heating a source fluid. Using FIGS. 1-4 as examples, method 500 can be implemented using the exhaust heat recovery transport. In one or more embodiments, method 500 can be performed on-the-fly to heat source fluid for fracturing operations, such as heating water to generate fracturing fluid and/or act as an anti-icing system that heats ambient air and/or thaws fracturing equipment. Although FIG. 5 illustrates that the blocks of method 500 are implemented in a sequential operation, method 500 is not limited to this order of operations, and instead other embodiments of method 500 may have one or more blocks implemented in parallel operations. For example, blocks 506 and 508 can be implemented sequentially or in parallel.

Method 500 may start at block 502 and covert an exhaust heat recovery transport from a transportation mode to an operational mode. Recall that in transportation mode, the exhaust heat recovery transport may include connections, such as the ventilation air connections, that are positioned to fit within specified dimensions. Using FIG. 1 as an example, to properly connect the exhaust heat recovery transport to the turbine-electric generator transport 104 and the inlet and exhaust transport 106, the exhaust heat recovery transport 102 is able to move and adjust one or more connections to an operation state. FIGS. 3A and 3B discuss in more detail about transitioning the exhaust heat recovery transport from transportation mode to operational mode and vice versa. Method 500 may then move to block 504. At block 504, method 500 may then receive, at a heat transfer assembly of the exhaust heat recover transport, exhaust air from a power generation system when in operational mode. Using FIG. 1 as an example, the exhaust heat recovery transport 102 may receive a turbine's exhaust air from the turbine-electric generator transport 104.

Method 500 continues to block 506 and determines the received incoming temperate and flow rate of the received exhaust air. As discussed with reference to FIG. 2, the turbine-electric generator transport produces exhaust air at certain temperatures and flows rates depending on the power load the turbine-electric generator transport experiences. As the power load for the turbine-electric generator transport increases, so does the temperature and flow rate of the exhaust air. In one or more embodiments, method 500 may determine the received incoming temperate and flow rate of the exhaust air using measure sensors and/or derive the parameters based on the current power load of the turbine-electric generator transport. Hence, the temperature and flow rates of the exhaust air may not be constant when heating source fluid. Afterwards, method 500 moves to block 508 and determines the incoming temperature of the source fluid. In one or more embodiments, method 500 utilizes a temperature sensor to measure the source fluid's incoming temperature.

Method 500 may then continue to block 510 and pump the incoming source fluid in the heat transfer assembly at a pressure based on the temperature and flow rate of the exhaust air, and the incoming temperature of the source fluid. In other words, method 500 may adjust the source fluid flow rate depending on the desired or target temperature difference between the incoming temperature of the source fluid and the temperature of the source fluid after exiting the heat transfer assembly. To increase the temperature difference between the incoming source fluid and heated source fluid, method 500 may pump the incoming source fluid at a relatively lower pressure to reduce the overall flow rate of the incoming source fluid into the heat transfer assembly. Method 500 can decrease the temperature difference by increasing the pumping pressure and flow rate of the source fluid.

At block 512, method 500 transfers, within the heat transfer assembly, the thermal energy of the exhaust air to the incoming source fluid to increase the incoming temperature of the source fluid to a target temperature. In one or more embodiments, the incoming source fluid may flow through one or more heat exchanger coils at a set flow rate. As the source fluid traverses through the heat exchanger coils, the source fluid increases in temperature. Method 500 is able to increase temperature of the source fluid the without transforming all of the source fluid into a gaseous state (e.g., steam). At least a portion of the incoming source fluid exits the heat transfer assembly in a liquid state. Method 500 may then move to block 514 and pump the heated source fluid from the heat transfer assembly to one or more destinations. In a fracturing operation context, method 500 may pump the heated source fluid to fracturing equipment, such as a water fracturing tank, a hydration-blender transport, and/or a defrosting package system.

Figure 6:
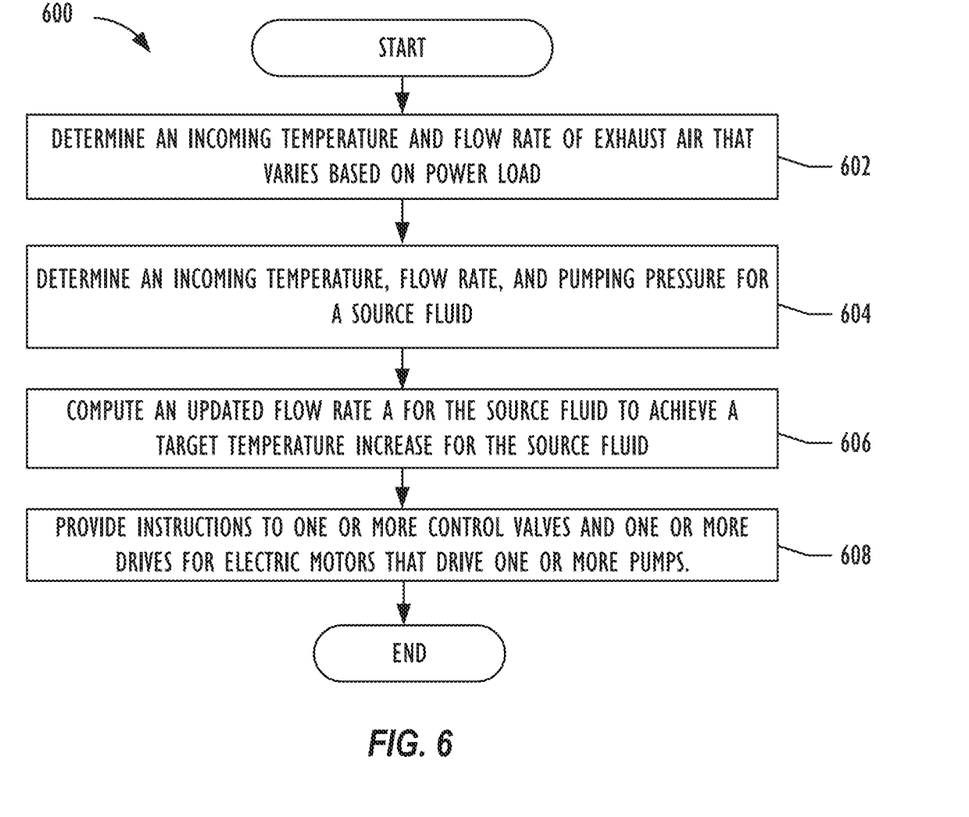
FIG. 6 is a flow chart of another embodiment of a method to recover exhaust heat for heating a source fluid.

FIG. 6 is a flow chart of an embodiment of a method 600 to control and regulate source fluid temperature increases based on varying exhaust air flow rate and temperature. Using FIG. 2 as an example, method 600 can be implemented using controller 222 or a control system. As previously discussed, because the exhaust air flow rate and temperature varies based on existing power load, the source fluid flow rate and pumping pressure may also vary to obtain a desired temperature increase for the source fluid. To account for varying exhaust air flow rate and temperature, method 600 starts at block 602 to determine an incoming temperature and flow rate of exhaust air that varies based on power load (e.g., power supplied to a fracturing fleet). At block 602, method 600 may derive the temperature and exhaust air flow rate based on the current power load of the turbine-electric generator transport. For example, method 600 utilizes a current known power load of the turbine-electric generator transport to determine an expected temperature and exhaust air flow rate. As an example, the temperature of the exhaust air that exits heat transfer assembly may range from about 600° F. to about 1100° F. depending on the turbine-electric generator transport's power load. When at a zero percent power load, method 600 may determine that the exhaust air exiting the heat transfer assembly may be about 600° F. At a 60 percent power load, method 600 may determine that the exhaust air exiting the heat transfer assembly may be about 880° F. Additionally or alternatively, method 600 can directly measure the temperature and exhaust air flow rate using one or more sensors.

Method 600 may proceed to block 604 and determines an incoming temperature, flow rate, and pumping pressure for a source fluid. To determine these source fluid pumping parameters, method 600 may receive sensor information from a variety of sensors. As an example, method 600 may obtain incoming temperature of the source fluid using one or more RTDs, flow rates for the source fluid using one or more flow meters, and pumping pressures using one or more pressure sensors. After determining the incoming temperature, flow rate, and pumping pressure for the source fluid, method 600 continues to block 606 and computes an updated flow rate for the source fluid to achieve a target temperature increase for the source fluid. Method 600 accounts for the incoming temperature and flow rate of the exhaust air when computing the updated flow rate for the source fluid. Method 600 may then continue to block 608 to provide instructions to one or more control valves and one or more drives for electric motors that drive the one or more pumps. The instructions are based on the updated flow rate computed in block 606.

Exemplary Fracturing Fleet

Figure 7:
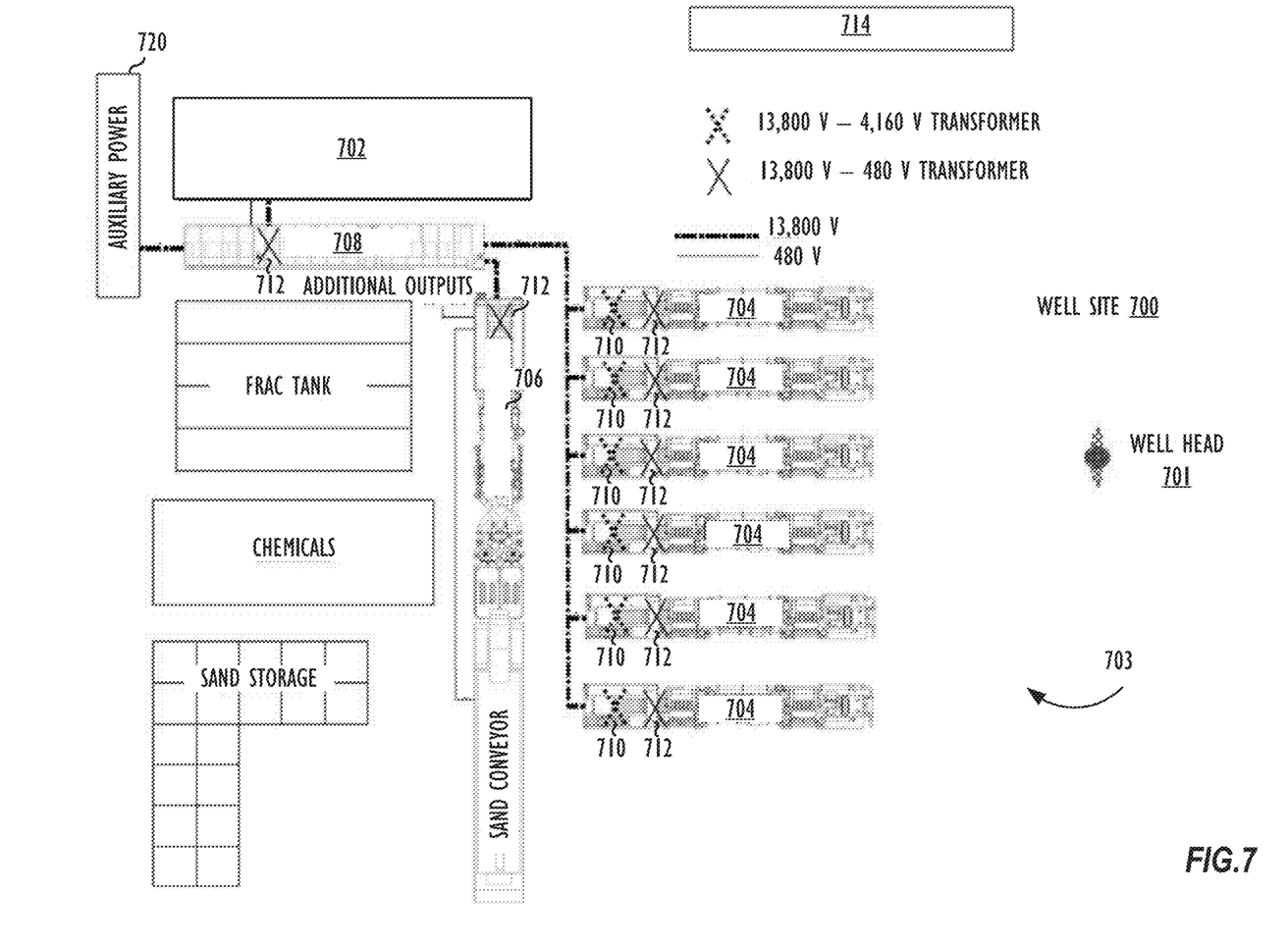
FIG. 7 is an exemplary fracturing fleet that includes an exhaust heat recovery system for transferring thermal energy to a source fluid.

FIG. 7 is an example of a fracturing fleet 703 located at well site 700 that includes an exhaust heat recovery transport. The exhaust heat recovery transport is part of the power source system 702 shown in FIG. 7. The power source system 702 provides power by connecting to the switch gear transport 708 using one or more cable connections. In one or more embodiments, the power source system 702 includes one or more turbine-electric generator transports that compress and mix combustion air with hydrocarbon fuel to spin and generate mechanical energy and then converts the mechanical energy to electricity. The power source system 702 includes an exhaust heat recovery transport that couples to the turbine-electric generator system to receive and utilize the exhaust heat for heating up fluids flowing through the exhaust heat recovery transport. The power source system 702 could also include an inlet and exhaust transport that provides ventilation and combustion air to the turbine-electric generator transport when generating electricity. Although FIG. 7 illustrates a single centralized source of electricity, other embodiments could have more than one power source systems 702 to employ a distributed source of electricity for powering fracturing equipment.

FIG. 7 illustrates other fracturing equipment that can be found within fracturing fleet 703. As shown in FIG. 7, the fracturing fleet 703 can include a switch gear transport 708 that connects to the power source system 702 and an auxiliary power transport 720. The auxiliary power transport 720 provides ancillary power for situations where the power source system 702 is out of service or where peak electric power demand exceeds the electric power output of the power source system 702. The switch gear transport 708 also includes a transformer 712 that steps down electric power received at a voltage level (e.g., 13.8 kV) from the auxiliary power transport 720 and/or power source system 702 to a lower voltage level (e.g., 480 V, 240 V and 110 V). In one or more embodiments, the low voltage level (e.g., 480 V) connection may provide electric power to ignite or start the power source system 702 and/or provide power to other fracturing equipment. For example, the switch gear transport 708 may house a black start generator to initiate and start the power source system 702.

As shown in FIG. 7, the switch gear transport 708 outputs and supplies medium voltage (e.g., 13.8 kV) directly to the hydration-blender transport 706 and the fracturing pump transport 704 without connecting to any intermediate transports. FIG. 7 depicts that the switch gear transport 708 generates multiple cable connections, where each fracturing pump transport 704 is directly connected to the switch gear transport 708 via a medium voltage (e.g., 13.8 kV) cable connection. The switch gear transport 708 also directly connects to the hydration-blender transport 706 using a medium voltage cable connection. The fracturing pump transport 704 includes transformers 710 and 712 for stepping down the electric power received from the switch gear transport 708 to multiple lower voltages (e.g., 416 0V and 480 V). The hydration-blender transport 706 includes a transformer 712 that steps down the voltage received from the switch gear transport 708 to a lower voltage (e.g., 480 V).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

The invention claimed is:

1. A method for heating fracturing fluid, the method comprising:
    detachably connecting a first end of an exhaust air connection disposed on a first transport to an outlet for exhaust air of a gas turbine disposed on a second transport, wherein a heat transfer assembly is disposed on the first transport between the first end and a second end of the exhaust air connection;
    detachably coupling an exhaust stack disposed on a third transport to the second end of the exhaust air connection, the exhaust stack outputting the exhaust air of the gas turbine;
    flowing source fluid through the heat transfer assembly;
    transferring, within the heat transfer assembly, thermal energy from the exhaust air flowing through the exhaust air connection to the source fluid to generate a heated source fluid;
    discharging the heated source fluid from the heat transfer assembly to a blender; and
    mixing at least one of a proppant and a chemical with the heated source fluid in the blender to create the heated fracturing fluid.

2. The method of claim 1, wherein the source fluid is water.

3. The method of claim 1, wherein the source fluid is a mixture of water and glycol.

4. The method of claim 1, wherein the blender is disposed on a fourth transport.

5. The method of claim 4, further comprising pumping the fracturing fluid into a wellbore with a frac pump disposed on a fifth transport to perform a hydraulic fracturing operation.

6. The method of claim 4, wherein the proppant includes one or more of sand, fracturing sand, ceramics, aluminum beads, resin-coated materials, and sintered bauxite.

7. The method of claim 4, wherein the fourth transport is a hydration transport, a blender transport, or a hydration-blender transport.

8. The method of claim 4, wherein the first transport, the second transport, the third transport, and the fourth transport are separate transports that are independently movable in a transportation mode.

9. The method of claim 1, further comprising:
    detachably connecting a first end of a combustion air connection disposed on the first transport to an intake of the gas turbine disposed on the second transport; and
    detachably coupling an air inlet filter housing disposed on the third transport to a second end of the combustion air connection.

10. The method of claim 9, further comprising:
    rotating the combustion air connection which is rotatably mounted on the first transport such that a longitudinal side of the combustion air connection is substantially perpendicular to a longitudinal side of the first transport; and
    pivoting a first heat recovery exhaust connector movably mounted on the first transport to connect and seal the first heat recovery exhaust connector with a second heat recovery exhaust connector fixedly mounted on the first transport, wherein the second heat recovery exhaust connector and the first heat recovery exhaust connector define the exhaust air connection;
    wherein the combustion air connection is rotated, and the first heat recovery exhaust connector is pivoted prior to detachably connecting the combustion air connection and the exhaust air connection respectively to the intake and the outlet of the gas turbine disposed on the second transport.

11. The method of claim 9, further comprising heating combustion air flowing through the combustion air connection and supplied to the intake of the gas turbine with the heated source fluid discharged from the heat transfer assembly.

12. The method of claim 1, further comprising:
    bypassing a portion of the source fluid away from the heat transfer assembly; and
    mixing the bypassed portion of the source fluid with the heated source fluid discharged from the heat transfer assembly.

13. The method of claim 1, further comprising adjusting one or more control valves to adjust a flow rate of the source fluid flowing through the heat transfer assembly.

14. The method of claim 13, wherein the flow rate of the source fluid is adjusted based on a desired target temperature of the source fluid.

15. A system for heating source fluid, the system comprising:
    a first transport including a gas turbine having an intake and an outlet, the outlet outputting exhaust air of the gas turbine;
    a second transport including:
        a first connection defining a first passage and including first and second ends, the first end of the first connection detachably connected to the outlet of the gas turbine; and
        a heat transfer assembly disposed in the first passage, wherein the heat transfer assembly transfers thermal energy from the exhaust air flowing through the first passage to a source fluid flowing through the heat transfer assembly;
    a blender receiving the heated source fluid from the heat transfer assembly and mixing it with at least one of a proppant and a chemical to create a heated fracturing fluid; and
    a third transport including an exhaust stack detachably coupled to the second end of the first connection, the exhaust stack outputting the exhaust air of the gas turbine.

16. The system of claim 15, further comprising a fourth transport that includes the blender.

17. The system of claim 16, further comprising a fifth transport that includes a frac pump, wherein the fracturing fluid created in the blender is pumped by the frac pump into a wellbore to perform a hydraulic fracturing operation.

18. The system of claim 15, wherein the source fluid is one of water and a mixture of water and glycol.

19. The system of claim 15, wherein the second transport further includes a second connection defining a second passage and including first and second ends, the first end of the second connection detachably connected to the intake of the gas turbine; and
   wherein the third transport further includes an air inlet filter housing detachably coupled to the second end of the second connection.

* * * * *